United States Patent [19]

Thompson et al.

[11] Patent Number: 4,935,954
[45] Date of Patent: Jun. 19, 1990

[54] AUTOMATED MESSAGE RETRIEVAL SYSTEM

[75] Inventors: John S. Thompson, Boulder; Thomas J. Tierney, Jr., Aurora, both of Colo.

[73] Assignee: AT&T Company, New York, N.Y.

[21] Appl. No.: 290,935

[22] Filed: Dec. 28, 1988

[51] Int. Cl.⁵ ..................... H04M 3/50; H04M 11/00
[52] U.S. Cl. ........................................ 379/89; 379/94; 379/96
[58] Field of Search .................. 379/88, 89, 67, 94, 379/96, 93, 92; 340/825.08

[56] References Cited

U.S. PATENT DOCUMENTS

| | | | |
|---|---|---|---|
| 4,431,870 | 2/1984 | May et al. | 379/357 |
| 4,612,416 | 9/1986 | Emerson et al. | 379/89 X |
| 4,748,656 | 5/1988 | Gibbs et al. | 379/93 |
| 4,790,003 | 12/1988 | Kepley et al. | 379/88 |
| 4,837,798 | 6/1989 | Cohen et al. | 379/88 |

OTHER PUBLICATIONS

"A PC and A Phone in One", Datamation, vol. 30, No. 18 (11-1-84), pp. 34-36, Charlie Howe.
Anita Seelig, "Now Let Your Computer Reach Out", (Apr. 1984), pp. 56-59, 109-112, Computers & Electronics.
Jack Powers, "Putting Your PC on the Line", vol. 1, No. 6, (Sep. 1983), pp. 142-149, PC World.

Primary Examiner—Thomas W. Brown
Attorney, Agent, or Firm—John C. Moran

[57] ABSTRACT

Apparatus for automatically polling message service systems to obtain messages for a user of the apparatus. The apparatus is a computer attached to the user's telephone connected to a communication switching system. The computer responds to messages from the communication switching system or to an internal real time clock timing out to poll a number of message service systems to obtain messages for the user. The computer automatically performs logon procedures, message access procedures and message deletion procedures with the various message service systems. If the message service system is audio only, the computer generates audio tones and interprets verbal instruction in order to implement the above procedures.

16 Claims, 11 Drawing Sheets

DCP FRAME FORMAT

POLLING TABLE

E-MAIL POLLING

EXTERNAL VOICE MAILING POLLING

POLLING ADMINISTRATION PROCESS 218

SERVICE ACCESS ADMINISTRATION ROUTINE

MESSAGE RECOVERY PROCESS 220

AUTOMATED MESSAGE RETRIEVAL SYSTEM

TECHNICAL FIELD

This invention relates to message systems and, in particular, an automated message retrieval system which resides on a personal computer that is associated with a business communication system.

BACKGROUND OF THE INVENTION

There are numerous message storage systems available to a business communication customer. A typical business communication system may have a voice mail system which stores, in digitally coded form, voice messages; a message center system where centralized attendants input messages into a data base as a result of calls being rerouted to the message center because the subscriber was unavailable; a leave word calling message system which stores a predefined "canned" message for the subscriber on a centralized data base when the calling party cannot reach the subscriber; a pink slip message system where a secretary covering for the subscriber manually fills out a message on a piece of note paper for the subscriber or enters it on a text mail system. The difficulty with these systems is that they are all independent of each other, have inconsistent storage media and message formats and lack any consistency of message content.

U.S. Pat. No. 4,612,416 describes a system which lights a light on the subscriber telephone set when any message storage system has a message waiting for the subscriber. In addition, a subscriber can access a voice mail message system and obtain a summary of messages on other message systems. The summary's content is: identification of the message service system, identification of party leaving the message, date/time of message, "canned" message (ex. please call). The subscriber is informed of the type of message (please call) but to receive the full body of the message the subscriber must access each individual message system.

SUMMARY OF THE INVENTION

The automated message retrieval system of the subject invention polls message service systems at predefined intervals and retrieves messages for the user of the retrieval system. Illustratively, the retrieval system is a software arrangement which runs on a personal computer. The personal computer is interposed between the subscriber's telephone station set and the port circuit of the business communication system which serves the subscriber's telephone station set. The automated message retrieval software responds to the business communication system transmitting a message waiting indication message to the telephone station set by polling the various message services which are assigned to the subscriber.

The message waiting indicator on the subscriber's telephone station set is activated by the business communication system whenever a message is stored on any one of the message storage systems identified above. The business communication system may or may not indicate which of the message storage systems has received a communication for the subscriber. The automated message retrieval software responds to this message waiting indicator signal from the business communication system by sequentially polling all of the various message services unless the business communication system indicates the one particular message storage system that has just received the communication for the subscriber in which case the message retrieval software polls only that message storage system.

In polling the message storage systems, the automated message retrieval software retrieves the message or the message header stored on the various message storage systems and transfers same to the memory of the personal computer for later access by the subscriber. This message retrieval includes collecting data messages from the leave word calling message storage system as well as digitally encoded voice from the voice mail system. In this fashion, the subscriber is relieved of the task of sequentially accessing all of the message storage systems to retrieve the messages that were transmitted to the subscriber while the subscriber was unavailable to answer the telephone station set. The subscriber can in a single message retrieval operation collect all of the messages from the personal computer memory, review all of the messages and either respond to the messages or store the messages on the personal computer memory for later review and access. The subscriber can keep a permanent file on the personal computer of the messages received without relying on one of the various message storage systems associated with the business communication system containing a record of the message so retrieved.

DETAILED DESCRIPTION

Figure 1:
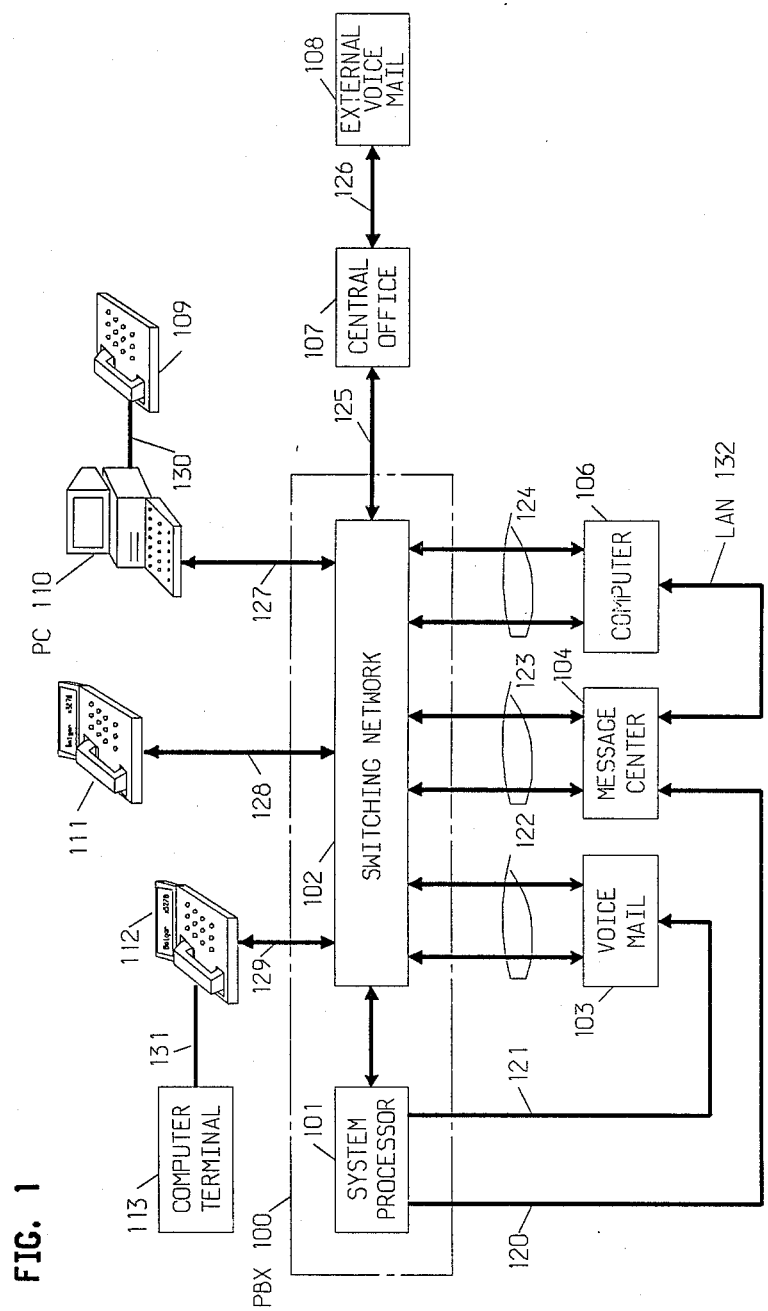
FIG. 1 illustrates the subject business communication system and the various devices connected thereto in block diagram form.

A system embodying the principle of this invention is illustrated in FIG. 1. The illustrated system consists of a PBX 100 which interconnects digital telephones such as telephone 111 or 112 and personal computers such as PC 110. PC 110 in turn interconnects digital telephone 109 to PBX 100. The digital telephone 112 can also be utilized to connect a computer terminal to the PBX 100. The latter PBX comprises system processor 101 and switching network 102. Also, directly interconnected to PBX 100 are message service systems 103, 104, and 106. In addition, message service system 108 is interconnected to PBX 100 via central office 107.

Figure 4:
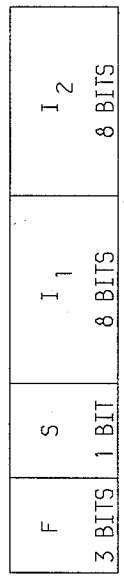
FIG. 4 illustrates the DCP format.

Communication paths 122, 123, 124, 127, 128, and 129 are implemented using a digital connect protocol (DCP) which provides for the transmission of control, voice, and digital data information using a frame format as illustrated in FIG. 4. The manner in which devices such as PC 110 are interconnected to switching network 102 utilizing the DCP protocol is described in U.S. Pat. No. 4,748,656 which is hereby incorporated by reference. In the DCP frame format as illustrated in FIG. 4, control information is transmitted in the S field, voice information is transmitted in the $I_1$ field, and digital data information is transmitted in the $I_2$ field. For example, when equipped with a data module, telephone 112 can be communicating with telephone 111 with telephone 112 transmitting the voice information in the $I_1$ field; and while computer terminal 113, via telephone 112, is communicating data to and from computer 106 via the $I_2$ field. Telephone 112 receives the digital information from computer terminal 113 via path 131 and forms the frame illustrated in FIG. 4. Simultaneously with the voice and digital communication to telephone 112, system processor 101 can be transferring control information via the S field to control various displays on telephone 112.

As illustrated in FIG. 1, the subscribers of telephones 109, 111, and 112 can be provided with the following message services: Leave Word Calling (LWC) as implemented on the AT&T System 85 Business Communication System, manual message taking by message center 104, electronic mail as provided by computer 106 which is operating under the UNIX ® operating system, and voice mail service by either voice mail system 103 or 108. Electronic mail is also referred to as text mail. With the exception of external voice mail service system 108, when any of the other message service systems have a message for telephone 112, a message is transmitted to system processor 101 via data links 120 and 121. Note, that in the case of computer 106, the latter computer transmits a message via LAN 132 to message center 104 which relays the message via datalink 120. System processor 101 is responsive to an indication that there is a message waiting for telephone 112 to transmit the necessary control information via the S field over communication path 129 to light the Message Waiting Light (MWL) on telephone 112. It is known in the art to provide other methods for alerting the subscriber. Telephone 112 is similar to the digital telephone sets described in U.S. Pat. No. 4,436,963. A description of the capability of the voice mail systems to light the MWL is described in U.S. Pat. No. 4,612,416.

In response to the MWL message, the subscriber of telephone 112 would interrogate system processor 101 via communication path 129 and switching network 102 by pressing the appropriate buttons on telephone 112 which is equipped with an alpha-numeric display resulting in the transmission of the appropriate information in the S fiel to find out which message service system had a message. The message service system would be by system processor 101 displaying a message in the alphanumeric display. Then, the subscriber has to manually retrieve the messages. For example, if the message was present in voice mail system 103, the subscriber must dial that system and be interconnected to the system utilizing switching network 102 and a path from group 122. Once this interconnection is made which is a voice connection, the subscriber goes through the normal logon process to retrieve the message using the dialing keypad.

The subscriber has to do similar operations with respect to message center 104 and computer 106. In addition, the subscriber has to periodically place a call to external voice mail system 108 to find out whether or not that system has any messages for the subscriber of telephone 112. If computer 106 has a message for the subscriber, the subscriber logons to computer 106 utilizing computer terminal 113 before being able to even know who sent the message.

The present invention overcomes the need for the subscriber to perform these time consuming polling operations by having PC 110 respond to the MWL message from system processor 101 to determine which message service system has the message and to obtain that message and the message header information defining the message origin and the message posting time. In addition, PC 110 is responsive to a real-time clock to periodically establish a connection to external voice mail system 108 to determine whether or not that system has a message for the subscriber of telephone 109.

As PC 110 collects the headers and the messages, it stores the messages for later retrieval and advantageously orders the information in a chronological time sequence. The subscriber uses the header information to determine which messages are waiting. Further, when the subscriber wishes to interrogate a particular message, PC 110 the either displays it on then PC 110's display or presents a voice message in an audio manner.

When computer 106 receives an electronic mail message for the subscriber of telephone 109, it transmits a message to message center 104 via LAN 132 defining that it has a message and who the message is for. Message center 104 is responsive to the message from computer 106 to transmit a similar message via datalink 120 to system processor 101. System processor 101 then transmits to the MWL message to PC 110. The latter is responsive to the MWL message to interrogate system processor 101 via communication path 127 and switching network 102 to determine that computer 106 has a message. PC 110 then establishes a digital data path via communication path 127, switching network 102, and a communication path from group 124 to computer 106. Once this path is established, PC 110 then executes the appropriate logon sequence and obtains the mail message from computer 106. PC 110 processes the information received from computer 106 to obtain a header in the appropriate format. Then, PC 110 logs off of computer 106 and abandons the digital data connection through communication path 127.

Message center 104 is manned by operators who are responsive to people attempting to contact the subscriber of telhepone 109 to take a message for that subscriber. Once an operator has obtained the message, she/he the enters this message via a digital terminal into message center 104. Message center 104 then sends an electronic mail message to computer 106 containing the message that the operator has entered. In addition, message center 104 transmits a message via datalink 120 to system processor 101 informing the system processor that there is a message from the message center for the subscriber of telephone 109. System processor 101 then transmits the MWL message to PC 110. In response, PC 110 obtains from system processor 101, using the control field of communication path 127, the identification of the message center having a message for the subscriber of telephone 109. PC 110 through internal message center parameters then establishes digital communication with computer 106 as was previously described and extracts and stores the message internally after processing it for the header information which is also stored internally.

When accessing external voice mail system 108, PC 110 utilizes an internal real-time clock to determine a predefined interval of time before automatically checking system 108 to see if there is a message for the subscriber of telephone 109. In addition, external voice mail system 108 is an audio-only system and is designed to interface only with a human subscriber utilizing a multifrequency dialing telephone. The normal procedure is for the subscriber to dial the external voice mail system 108. Upon receipt of the call, the system responds with a greeting and instructions for the subscriber to enter the password using the multifrequency dial on their telephone. After the password has been enterded, the subscriber utilizes the dialing to choose features, one of which is to retrieve a message. The message is simply given to the subscriber as an audio signal. PC 110 duplicates the operation of a human subscriber by utilizing an internal voice processor and multifrequency signal generator. PC 110 utilizes its internal multifrequency generator to enter the password in order to gain access to external voice mail system 108 and the voice processor to recognize the instructions which are given by system 108 in order to select the appropriate functions using the internal multifrequency generator. Once system 108 starts to transmit the voice message to PC 110, the latter PC stores this message internally and at a later point in time utilizes the voice recognition portion of the voice processor to extract header information.

PC 110 interfaces with voice mail system 103 in a similar manner to external voice mail system 108 with the following exceptions. First, PC 110 receives a MWL message from system processor 101 when voice mail system 103 has a message waiting for the subscriber of telephone 109. Second, the communication is only setup via path 127, switching network 102, and a path from group 122.

As the various message headers are gathered from the message systems, PC 110 stores these in an ordered list and creates indexes from each in order to access the message associated with each header. Provision is provided to let the subscriber access these headers and messages in a variety of ways.

Figure 2:
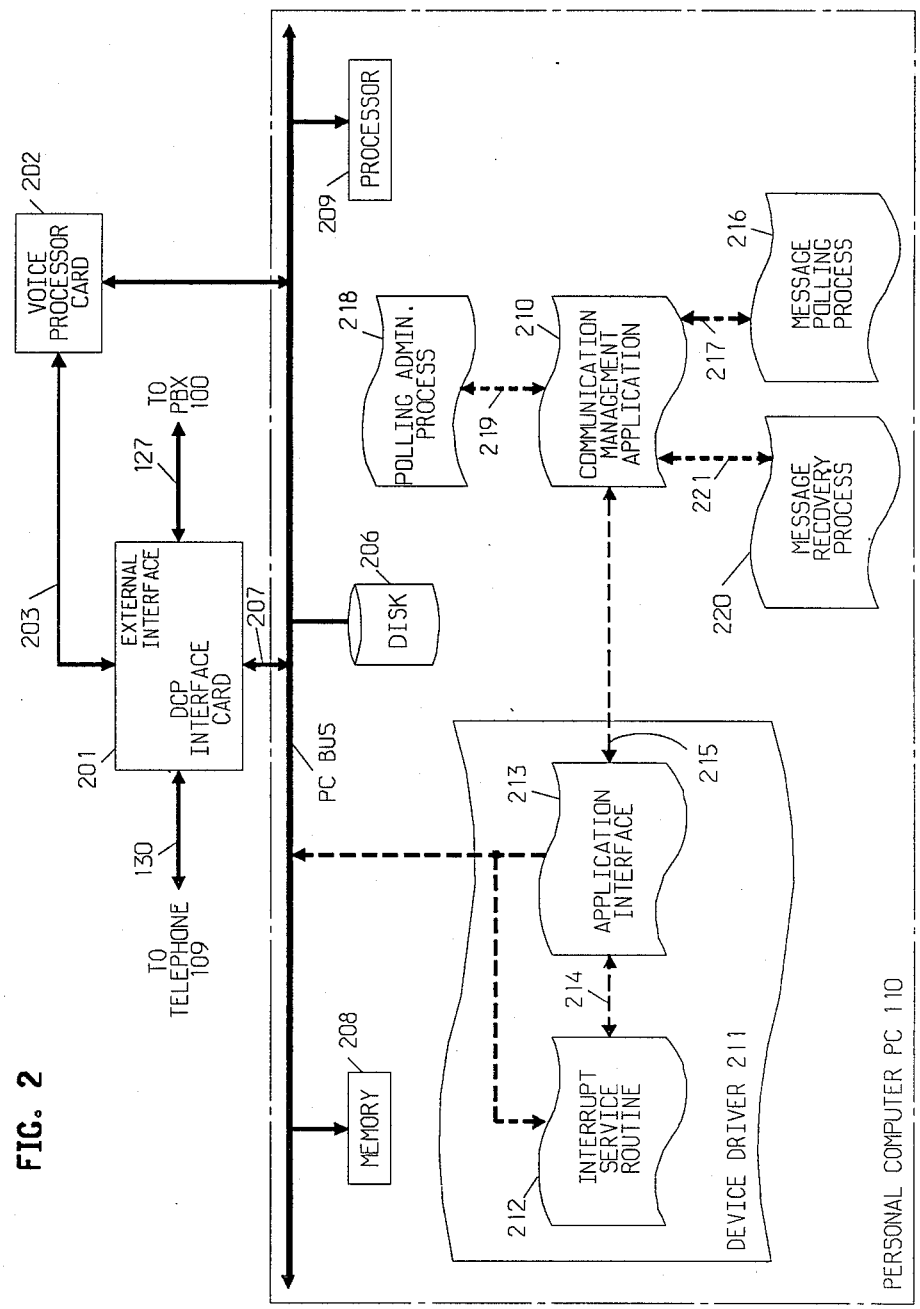
FIG. 2 illustrates the interface apparatus of the subject invention in block diagram form.

PC 110 may advantageously be an AT&T 6300 personal computer equipped with an AT&T PC/PBX Connection printed circuit card which is manufactured by AT&T (also referred to as the DCP interface card) and a voice processor card. Such a personal computer is illustrated in FIG. 2. PC 110 is illustrated as having a memory 208 and a processor 209. A program is stored in memory 208, and this program is shown symbolically as elements 210 through 221. DCP interface card 201 is utilized to interconnect PC 110 to PBX 100 via communication path 127. During normal telephone conversation, DCP interface card 201 receives the DCP frame format illustrated in FIG. 4 and transfers the $I_1$ field, containing the voice signals, to telephone 109 and the S field, containing the control information, and $I_2$ field, containing the digital data, to processor 209 via bus 207. As is described in U.S. Pat. No. 4,748,656, processor 209 interrogates the S field. If the information contained in the S field requires control actions that be performed on telephone 109, processor 209 generates a second S field to be included with the $I_1$ field received via communication path 127 for trasmission to telephone 109. Processor 209 directly processes the digital data received in the $I_2$ field as described in the above-mentioned U.S. Pat. No. 4,748,656. Processor 209 receives the MWL message from card 201 when that message is transmitted from system processor 101 to PC 110.

Card 201 contains a signal processor capable of generating multifrequency tones and decoding the various audio signals used within telephone systems. In addition, card 201 under control of processor 209 can direct the voice signals received from PBX 100 to voice processor card 202 via path 203. The latter path is connected to the external interface port of card 201. In addition, card 201 can accept voice signals from voice processor card 202 and direct these signals either to telephone 109 or to PBX 100.

An example of the use of card 201 is when PC 110 is obtaining messages from external voice mail system 108. To make the voice connection to central office 107 via paths 127, switching network 102, trunk 125, PC 110 transmits control information to the signal processor internal to card 201 to cause it to generate the proper multifrequency signaling so as to dial external voice mail system 108. Once PC 110 is connected to external voice mail system 108 which is performed by utilizing the internal signal processor to detect the ringing signals and to determine that external voice mail system 108 has picked up the call. Then, PC 110 directs control messages to card 201 so that the audio signals being received from external voice mail system 108 are directed to voice processor card 202 so that the voice recognition unit can be utilized to determine when to respond to the login commands from the voice mail system. PC 110 logs on to the system by utilizing the signal processor in card 201 to output the login digits as multifrequency signals.

Figure 3:
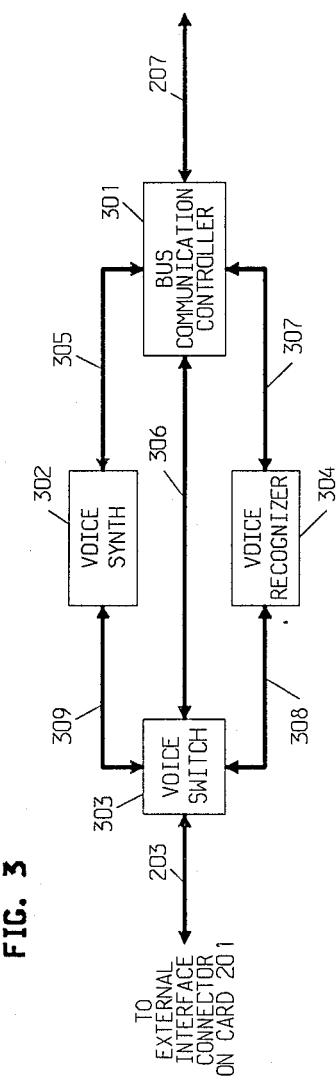
FIG. 3 illustrates a detailed schematic diagram of a voice processing apparatus.

Voice processor card 202 is illustrated in block diagram form in FIG. 3. Bus communication controller 301 is identical to the bus communication controller for card 201 as described in detail in aforementioned U.S. Pat. No. 4,748,656. Voice switch 303 is responsive to control information from bus communication controller 301 to either direct incoming voice signals to voice recognizer 304 via path 308 or to accept voice signals from voice synthesizer 302 via path 309 or to direct and receive voice signals from controller 301. Bus communication controller 301 controls voice synthesizer 302 and voice recognizer 304 and receives data from these devices via paths 305 and 307, respectively. Voice synthesizer 302 may function similarly to the Voice Power speech-processor circuit board which is manufactured and sold by AT&T or the one described in U.S. Pat.No. 4,709,390. Voice recognizer 304 may function similarly to those described in U.S. Pat. Nos. 4,624,008, 4,277,644, or 4,349,700. As the digitally coded voice message is received by voice switch 303 from external voice mail system 108, it is transferred via path 306 to bus communication controller which in cooperation with processor 209 stores this information in disc 206 of FIG. 2. In addition, other header and messages are also stored in disc 206 either under control of bus communication controller 301 or processor 209.

Device driver 211 consists of elements 212 through 215 and its functions with respect to DCP interface card 201 where described in aforementioned U.S. Pat. No. 4,748,656. Device driver 211 has been extended here to provide similar function respect to bus communication controller 301 as illustrated in FIG. 3. As described in the latter patent, interrupt service routine 212 and application interface 213 function to receive the control information in the S field and the digital data in the $I_2$ field from PBX 100 or from telephone 109 and to transfer this information to communication management application 210. In addition, routine 212 and interface 213 receive commands from communication management application 210 and transfer these to DCP interface card in order to generate the necessary messages and data in the DCP frame format. When the MWL message is received by DCP interface card 201, it is transferred to communication management application 210 via routine 212 and interface 213 and software path 215. Digital data as received from the various message systems is also transferred in a similar manner to communication management application 210. This type of a software architecture is well-known in the art.

During the polling for message, communication management application 210 invokes message polling process 216 via software path 217 to process incoming messages and to receive messages which are to be transferred out. The polling administration process 218 is utilized to administer the parameters which specify how to access the various message service systems, the type of access, how the information is to be stored once received, and the type of polling that is to be performed. Message recovery process 220 is utilized to allow the subscriber to access the headers and the messages and to determine where these messages are and what course of action should be taken in response to these messages.

Consider now in greater detail the functions performed by message polling process 216 of FIG. 2. The polling operation is controlled by the polling table illustrated in FIG. 5. Poll execute word 501 contains a plurality of bits. If set, each bit indicates that a corresponding service should be polled. Words 502 through 507 correspond to bits 510 through 516, respectively. Words 502 through 507 define the location of the various polling routines. For example, when set, bit 510 indicates that a MWL message has been received and indicates that the routine pointed to by word 502 should be excuted. Bits in poll execute word 501 are set by interrupt service routine 212 of FIG. 2 and by the polling routine illustrated in FIG. 8.

Figure 6:
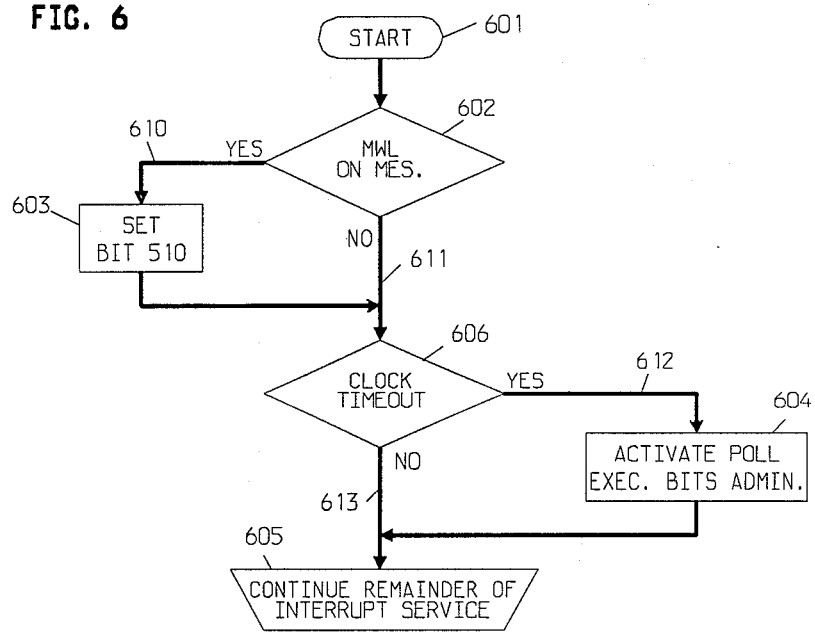
FIG. 6 illustrates, in flow diagram form, additions to interrupt service routine 212 of FIG. 2.

FIG. 6. illustrates the modification to interrupt service routine 212 in order to implement the interrupts for the polling functions. The interrupts service routine is entered at entry point 601. First, a check to see if the cause of the interrupt was a MWL message being received over the DCP link from PBX 100 in decision block 602. If the cause of the interrupt was the receipt of the MWL message, path 610 is taken and block 603 is executed which sets bit 510 in the poll execute word. Control is then passed to path 611. If the MWL message had not been received, control is passed from decision block 602 via path 611 to block 606. In the latter block, a check is made to see if the real time clock has timed out indicating that the time polling of message services is to take place. If the answer is yes, then the exit from decision block 606 is via path 612 to block 604 where the poll execute bits of the poll execute word 501 are set as defined in administration process 218. In the present, example, there is only one timed polled message service which is the external voice mail system 108, hence, only bit 514 is set in block 604. After block 606 or 604, path 613 is followed to a continue the remainder of the interupt service routine as depicted by block 605.

Figure 7:
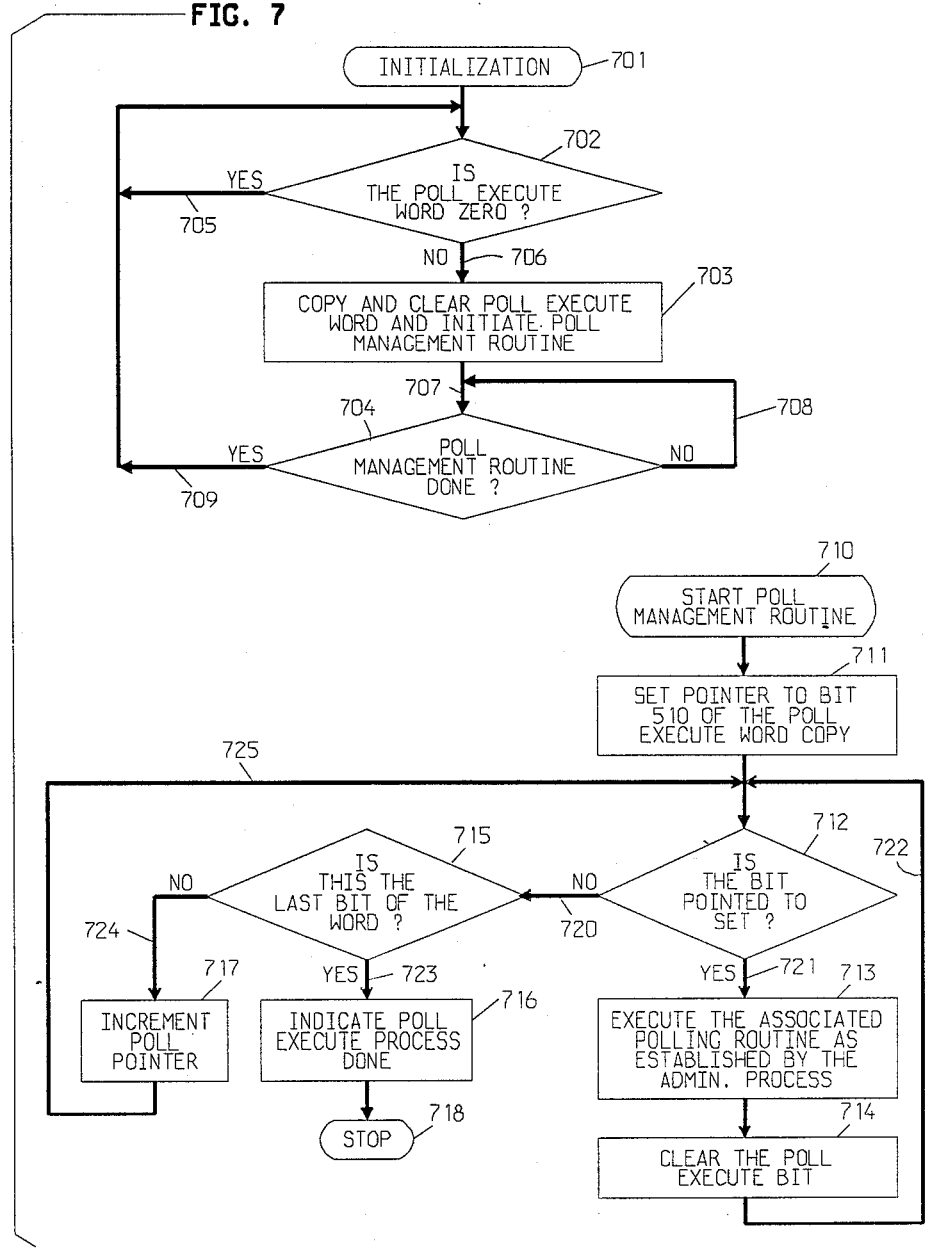
FIG. 7 illustrates, in flow diagram form, message polling process 216 of FIG. 2

FIG. 7 illustrates two of the routines which are part of message polling process 216 of FIG. 2. The routine illustrated by blocks 701 through 704 is continuously running in the background on processor 209. This routine is initialized during the start up of processor 209 by block 701. The routine checks to see if poll execute word 501 is zero. If poll execute word 501 is zero, then path 705 is followed and the same decision is repeated. If poll execute word 501 is non-zero, path 706 is followed to block 703. Within block 703, a copy is made of the poll execute word and the poll management process is initiated. A copy is made of poll execute word 501 so that a later interrupt can set this word while the polling process is taking place. Path 707 is followed from block 703 to decision block 704 which waits until the poll management process, which is blocks 710 through 717, has completed the polling process.

Poll management routine is shown as blocks 710 though 718 in FIG. 7. This routine is entered via entry point 710. In block 711, a pointer is set to point to bit 510 in the copy of poll execute word 501. A check is made in decision block 712 to see if this bit has been set to a one. If the tested to bit is a zero, then path 720 is followed to decision block 715 where a check is made to see if this is the last bit of the poll execute word copy. If it is the last bit of the poll execute word copy, path 723 is followed to block 716 which indicates the poll execute process is done, and the routine is execute via exit point 718. If the tested to bit was non-zero, exit from decision block 712 is path 721 to block 713. Within block 713, a routine is executed. The expected routine is identified by the fact that the tested bit in the copy poll execute word 501 corresponds to one of the words 502 through 507 which points to the executed routine. After the execution of selected routine, block 714 is executed which clears the polled execute bit, and control is returned back to decision block 712 via path 722. This process continues until all the bits in the poll execute word copy have been tested.

Figure 8:
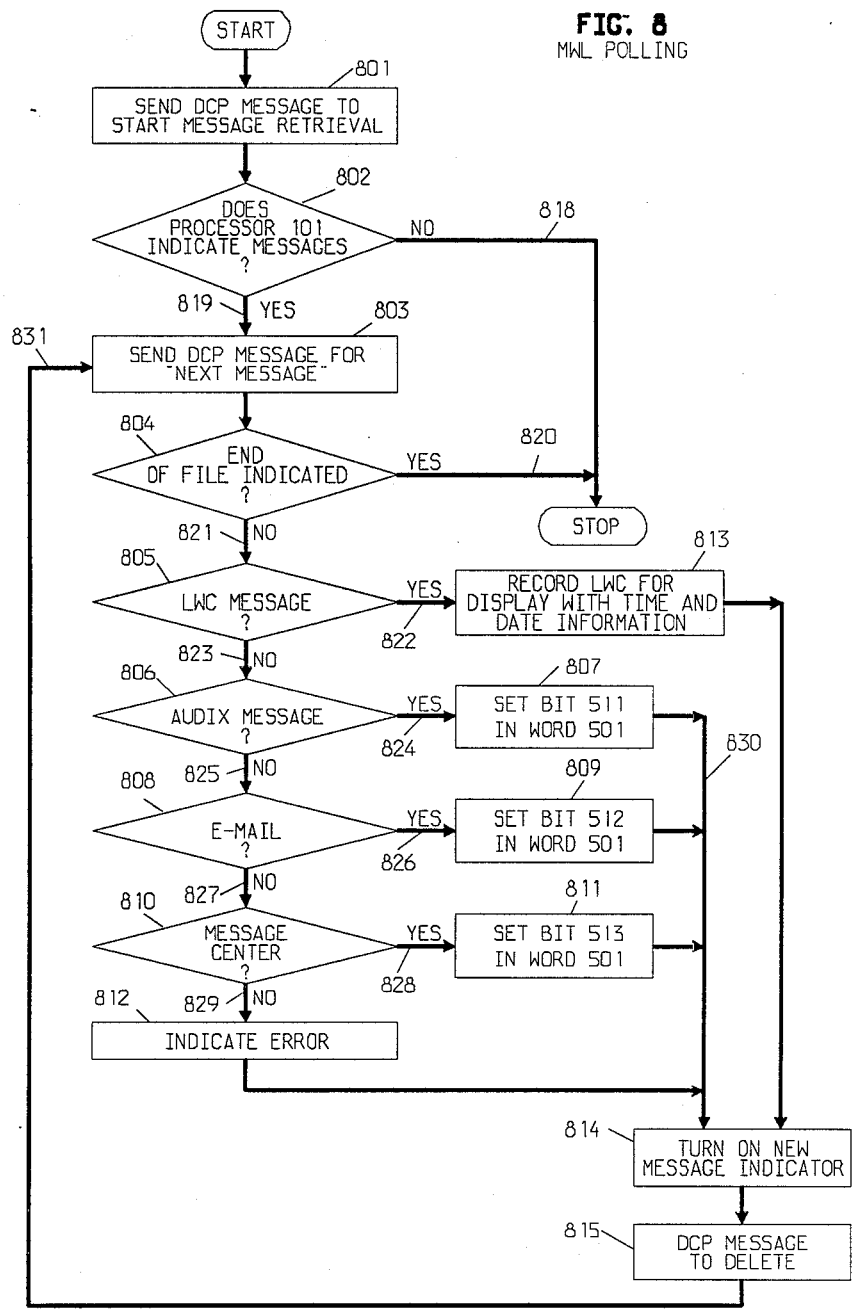
FIG. 8 illustrates, in flow diagram form, MWL polling routine.

FIG. 8 illustrates the MWL polling routine that is executed in block 713 of FIG. 7 if bit 510 was set in the polled execute word copy indicating that a MWL signal had been received from PBX 100. The MWL Polling routine is pointed to by word 502 of the polling table illustrated in FIG. 5. First, block 801 is executed to start the message retrieval by sending the appropriate bit pattern in the S field of a message transmitted via DCP link 127 to PBX 100. When a return message is received from PBX 100, decision block 802 examines this message to see whether it indicates that messages are waiting in processor 101 for PC 110. If the indication is negative, an error has occurred, path 818 is followed, the process stops, and control is returner to block 713. If there messages, path 819 is followed to block 803 where another DCP message is sent requesting the next message. This procedure is part of the normal operating sequence of obtaining messages from processor 101.

When processor 101 responds, decision block 804 checks to see if this is an "end of file" indication. If the answer is yes, path 820 is followed and control is returned to routine 713. If the answer is no, then path 821 is followed to decision block 805. Decision block 805 determines whether or not the response from processor 101 is a leave word calling (LWC) message. If the answer is yes, path 822 is followed to block 813 where the LWC message is stored with the time and date for later display. After execution of block 813, block 814 is executed to turn on the new message indicator which will be utilized by message recovery process 220 when that process is executed. In addition, the message waiting indicator is illuminated on telephone 109. After execution of block 814, block 815 is executed to transmit a DCP message informing processor 101 to delete the LWC message that was just received and control is returned to block 803 via path 813.

If the result of the decision in decision block 805 was no, path 723 is followed to decision block 806. The latter block determines whether or not the message indicates that there is a message waiting on voice mail system 103. If the answer is yes, then block 807 is executed via path 824 to set bit 511 in poll execute word 501. The setting of this bit will result in the routine illustrated as blocks 710 through 718 detecting that this bit is set and executing the polling routine to poll voice mail system 103. If the result of the decision in decision block 806 was no, path 825 is followed to decision block 808. The latter decision block determines whether the message from processor 101 indicated that there was electronic mail from computer 106. If there was electronic mail, block 809 is executed via path 826 to set bit 512 in poll execute word 501. If there was no electronic mail, path 827 is followed to decision block 810. The latter block determines whether there was a message from message center 104. If there was no message from the message center 104, then an error has occurred, and this fact is recorded in the system by the execution of block 812 via path 829. If there is a message from the message center 104, block 811 is executed via path 828 to set bit 513 in poll execute word 401. After the execution of blocks 805 through 812, path 830 is followed to block 814. The functions performed by block 814 and block 815 have been previously described.

Figure 9:
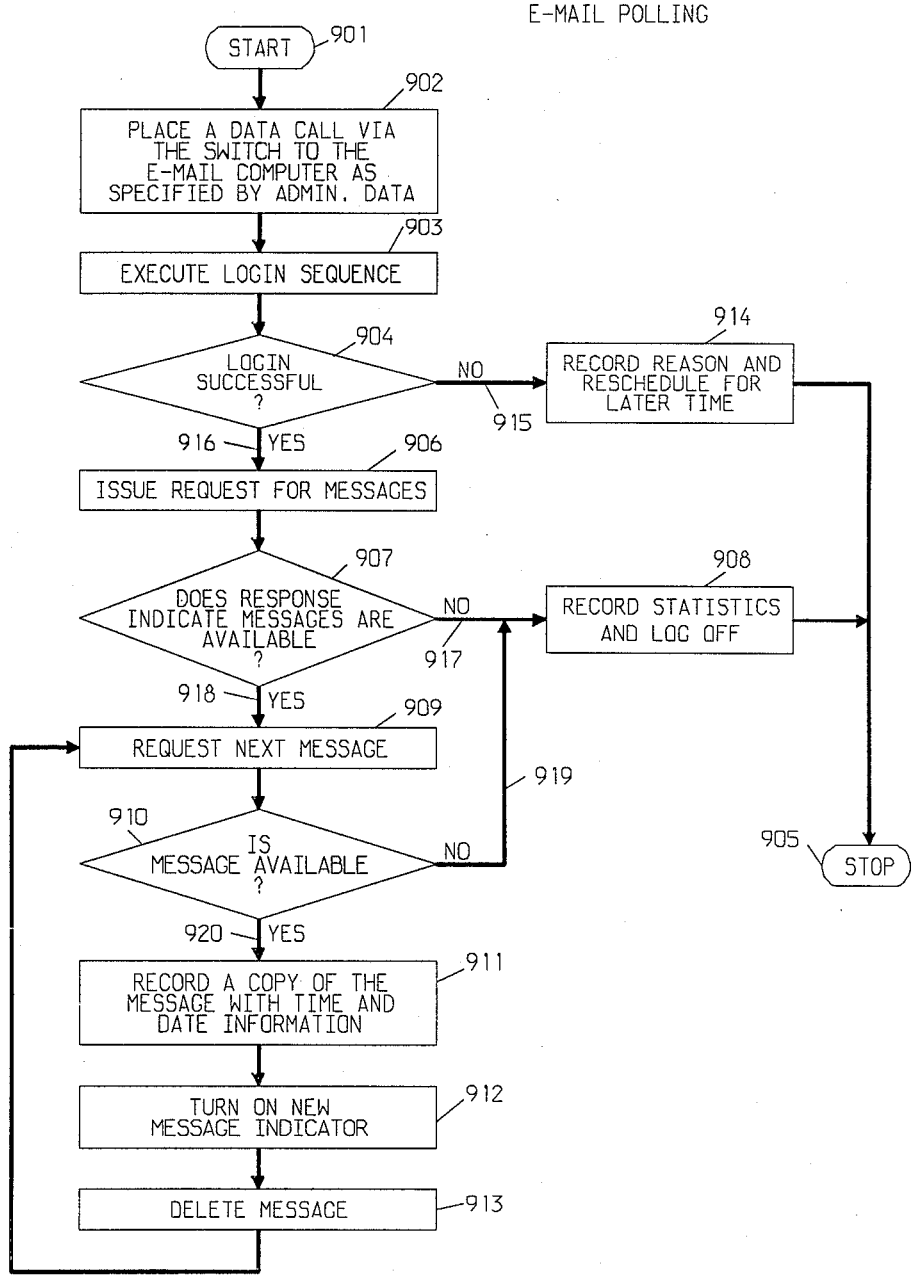
FIG. 9 illustrates, in flow diagram form, E-Mail polling routine.

If upon execution of decision block 808 of FIG. 8, block 809 was executed setting bit 512 in poll execute word 501, block 713 of FIG. 7 will at some point in time later give control to the e-mail point routine illustrated in FIG. 9. This routine then polls computer 106 to obtain the messages for PC 110. This polling is done by logging on to computer 106 and obtaining these messages and then creating header information and storing the header information with the remainder of the message. The e-mail polling routine is entered from entry point 901. In block 902 a data call is placed through switching network 102 on the I₂ portion of DCP link 127 via one of the DCP links 124 to computer 107. The information specifying the destination of computer 106 is contained within administrative data which is collected by polling administration process 218 from the user of PC 110.

After gaining access to computer 106, block 903 is executed to logon to computer 106 using well known techniques. Whether or not this login sequence was successful is tested for in decision block 904. If unsuccessful, block 914 is executed via path 915 to record the reason and to reschedule another login attempt at a later point and time. After execution of block 914 the e-mail polling routine stops at exit point 905 and control is returned to block 713 of FIG. 7.

If the login sequence was successful, path 916 is followed to block 906, where the proper sequence of ASCII characters is transmitted to computer 106 to request the messages. The sequence of ASCII characters is specified by the user using polling administration process 218 of FIG. 2. Decision block 907 checks to see whether the response from computer 106 indicated that there were messages available. If no messages were available, block 908 is executed via path 917 to record the statistics from this attempt and to log off from computer 106. If messages were available, bock 909 is executed via path 918, and the next available message is request from computer 106. Then, decision block 910 is executed to determine whether or not computer 106 responded with a message. If computer 106 did not respond with a message, path 919 is followed to block 908. If computer 106 had a message, decision block 910 transfers control to block 911 via path 920. Block 911 stores the message after extracting the header information which defines who the message is from and adding the time and the date to this header information and stores the header information as well.

Next, block 912 is executed to turn on the new message indicator. After execution of block 912, block 913 is executed to transmit to computer 106 the necessary ASCII characters to delete the message just retrieved. After execution of block 913, control is once again transferred to block 909. After all of the messages have been obtained from computer 106, decision block 910 transfers control to block 908 via path 917. Control then transferred back to block 713 of FIG. 13 after execution of blocks 908 and 905.

Figure 10:
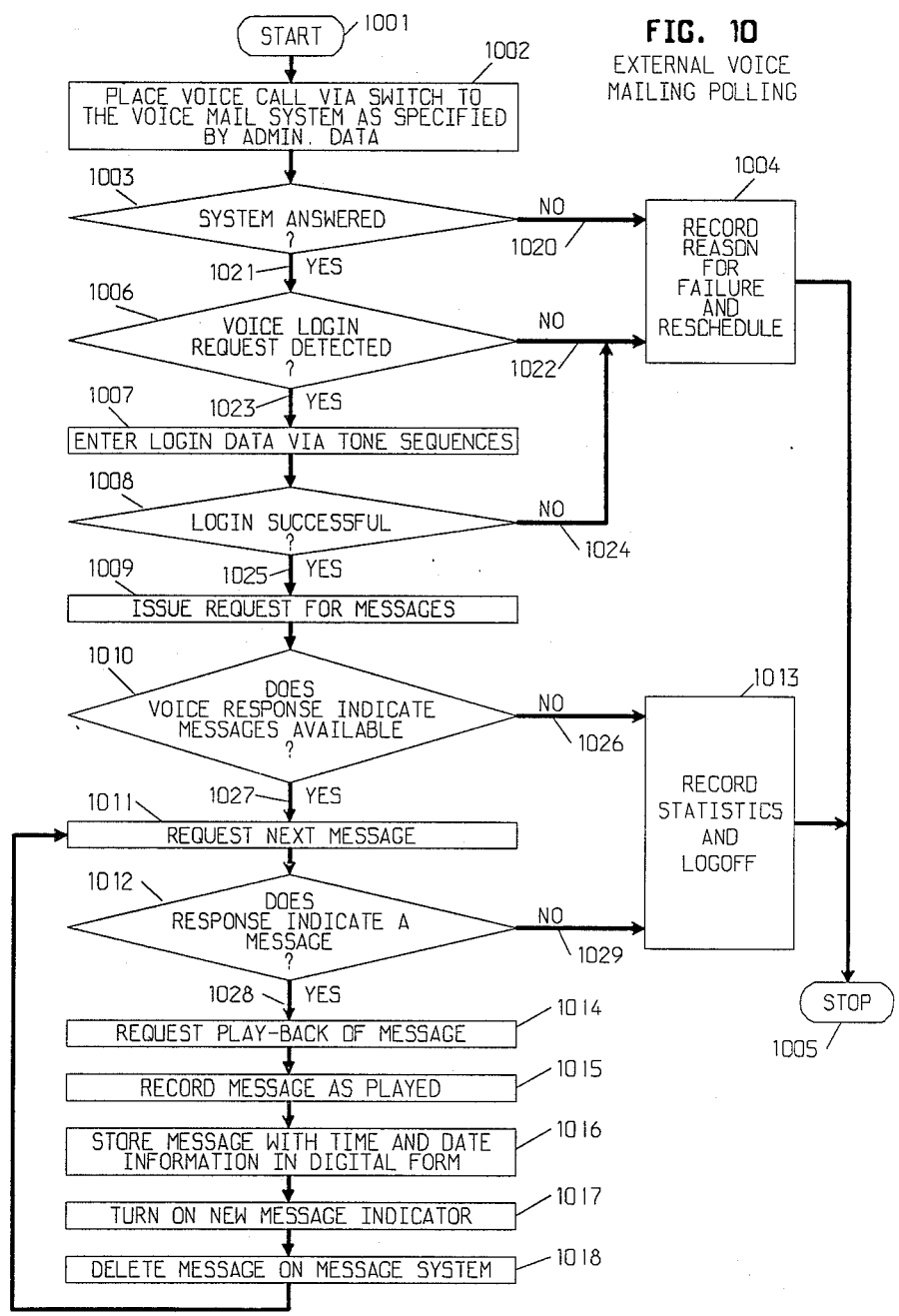
FIG. 10 illustrates, in flow diagram form, External Voice Mailing Polling routine.

If bit 514 of poll execute word 501 was set indicating that the real time clock had timed out which indicates that external voice mail system 108 should be polled, block 713 of FIG. 7 will at some point in time transfer control to the external voice mailing polling routine illustrated in FIG. 10. This routine is entered at entry point 1001, and the first block executed is block 1002. The latter block causes PC 110 to place a call via switching network 102 and central office 107 to external voice mail system 108. The first part of the call that is placed through switching network 102 is done by transmitting the appropriate control messages via the S field of DCP link 127 to system processor 101 which will then set up a voice connection via switching network 102 to a central office 107. Once the connection is made to central office 107, PC 110 utilizes the signal processor of card 201 to detect dial tone and then to output multi-frequency dialing that specifies a connection to voice mail system 108 via communication path 126. Decision block 1003 then uses the signal processor to determine if voice mail system 108 answered the call placed to it. If voice mail system 108 did not answer, block 1004 is executed via path 1020. Block 1004 records the reason for the failure to obtain a message from system 108 and reschedules a later attempt. The rescheduling is done by changing the interval during which the real time clock interrupts and sets bit 514 of the poll execute word 501. After execution of block 1004, the routine is exited via 1005 and control is returned back to block 713 of FIG. 7.

If voice mail system 108 did answer the call placed to it via central office 107, control is passed to decision block 1006 via path 1021. Decision block 1006 utilizes voice recognizer 304 of voice processor card 202 of FIG. 2 to recognize the voice message from system 108 that indicates the start of the logon procedure to system 108. If the logon message is not detected, control is passed to block 1004 via path 1022. If the logon message is detected, control is passed to block 1007 via path 1023.

Block 1007 then logs on to voice mail system 108 by generating the proper multi-frequency tones utilizing the signal processor of card 201. If this login sequence is successful, the voice mail system 108 will respond with a voice message indicating the successful logon. Decision block 1008 determines whether or not this successful logon message is received from voice mail system 108 by once again utilizing voice recognizer 304 of card 202. If the correct message is not received from voice mail system 108, control is transferred to block 1004 via path 1024.

If the login was successful, block 1009 is executed via path 1025 to request the messages from voice mail system 108 by generating the proper multi-frequency tones utilizing the signal processor of card 201. Decision block 1010 uses voice recognizer 304 of card 302 to determine if the voice response indicates messages are available. If no messages are available, control is transferred to block 1013 via path 1026. If a message is available, control is transferred to block 1011 via path 1027 to request this message from system 108.

Decision block 1012 is next executed which utilizes the voice recognizer of card 202 to determine whether or not system 108 has responded with a message. If the response does not indicate a message, control is tranferred to block 1013 via path 1029 to record statistics and log off.

If a message was received, control is transferred to block 1014 which requests that message be played back from system 108. Next, as the message is being played back, PC 110 stores this information as it is received via voice switch 303 and bus communication controller 301 of card 202 into disk 206 of FIG. 2. If the message from external voice mail system 108 includes a header, this header is first converted to ASCII characters by voice recognizer 304 and is stored along with the time and date in a header file in block 1016. Block 1017 turns on the new message indicator and transfers control to block 1018. The latter block then transmits in the necessary multi-frequency tones to cause voice mail system 108 to delete the received message. Control is then transferred from block 1018 to block 1011. This process continues until all the messages are received from voice mail system 108.

The polling of voice mail system 103 is similar to that for external voice mail system 108. The main difference that it is not necessary to setup a communication path through central office 107.

Figure 5:
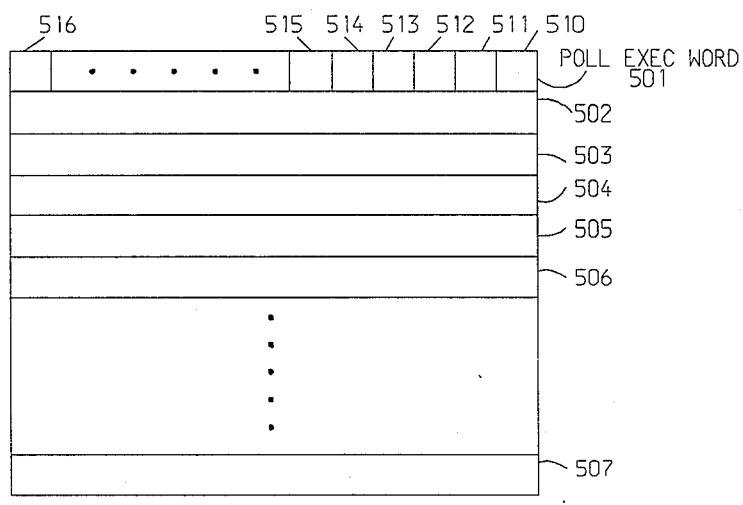
FIG. 5 illustrates the structure of the polling table.
Figure 11:
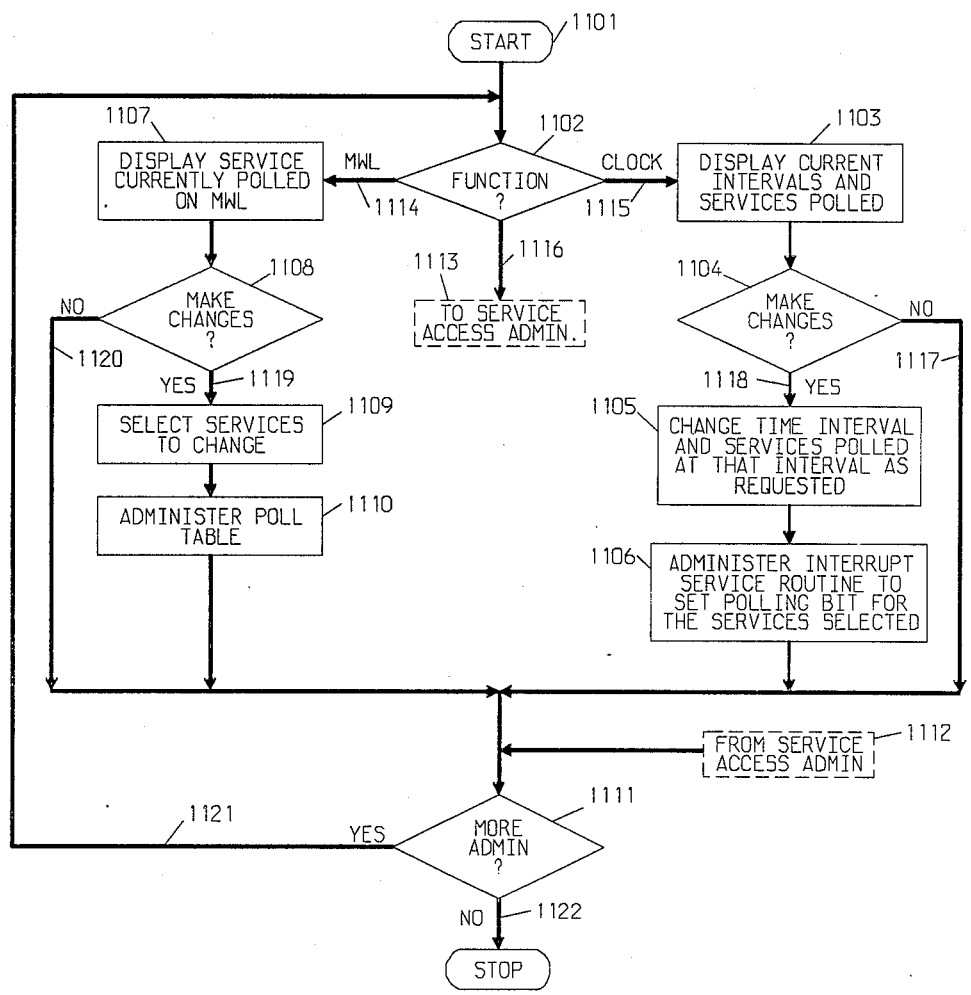
FIG. 11 illustrates, in flow diagram form, polling administration process 218 of FIG. 2.

Polling administration process 218 of FIG. 2 is illustrated in greater detail in FIG. 11. This process is initiated by user of PC 110 when the user wishes to make changes in the message services polled or in the manner in which that polling takes place. The process is entered via entry point 1101. The first question that is presented to the user by means of messages displayed on the CRT display of PC 110 is what function the user wishes to perform. The user indicates whether they want to modify the MWL polling, real time clock polling, or administer the parameters which define the accessing of the various message services. If the customer indicates that they want to modify the actions taken when a MWL message is received from processor 101, path 1114 is followed to block 1107. PC 110 then displays the services currently polled upon receipt of a MWL message and control is pased to decision block 1108. In this decision block the customer is asked whether or not they want to modify the polling table of FIG. 5 or not. If the customer chooses not to modify that table, then control is passed via path 1120 to decision block 1111. If the user wishes to make changes, control is passed to 1109 via path 1119 to allow the customer to select the message service to be changed. Next, control is passed to block 1110 where the poll table illustrated in FIG. 5 is administered has been accomplished, control is transferred to decision block 1111 where the customer is given the opportunity to continue the administration process or terminate this process. If the customer chooses to terminate, path 1122 is followed, and the administration process is terminated. If the customer wishes to continue, path 1121 is followed and control is returned to decision block 1102.

If the user wishes to make modifications with respect to the messages services which are polled at fixed time intervals, path 1115 is followed to block 1103 where the message services being polled in this manner are displayed as well as the intervals at which those sevices are polled. Next, decision block 1104 is executed to allow the user to modify either the time intervals or what services are polled. If the user chooses not to make any changes, path 1117 is followed and control is given to decision block 1111. If the user chooses to make changes, control is given to block 1105 via path 1118. Block 1105 gives the user the opportunity to add or delete message services from this type of polling and/or modify the time intervals at which this polling is done. Once the changes desired by the customer have been received by block 1105, block 1106 is executed. The latter block then administers the interrupt service routine to change the time intervals and inform it as to which bits in poll execute word 501 of FIG. 5 are to be set in response to the various time intervals. After execution of block 1106, control is transferred to 1111. If the user wants to admunister the manner in which are accessed, path 1116 is followed and the service administration access routine is executed via block 1113. After the services administration access routine has perfomed the functions requested by the user, control is transferred back to block 1111 via entry point 1112.

Figure 12:
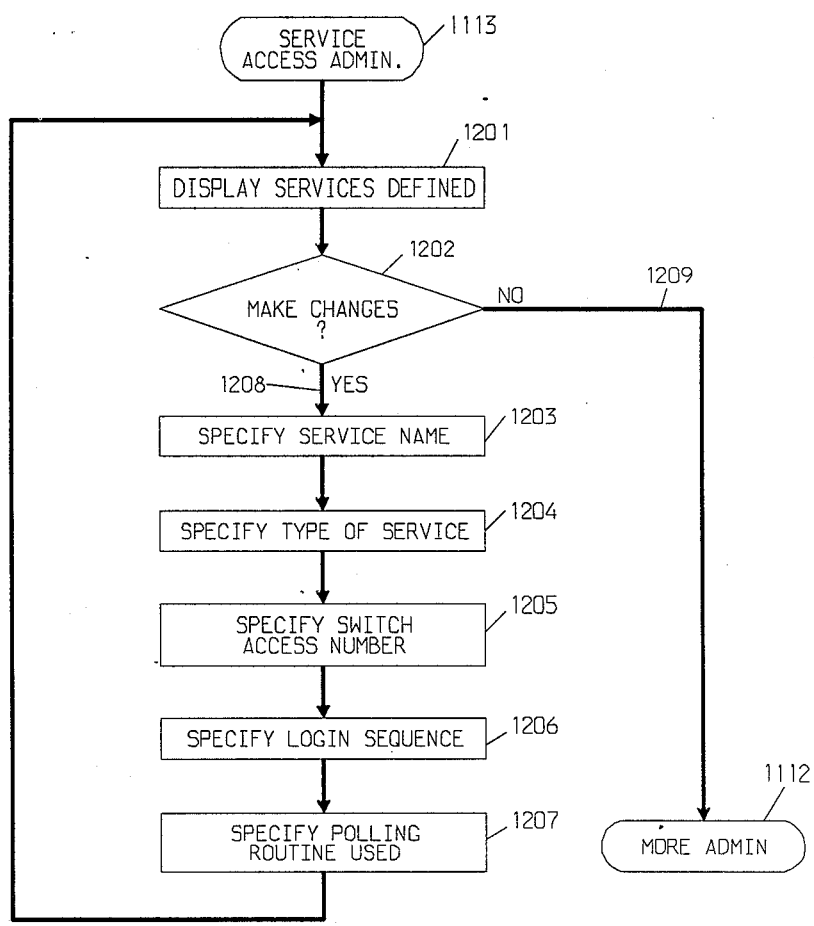
FIG. 12 illustrates, in flow diagram form, service access administration routine 1113 of FIG. 11.

The service access administration routine is illustrated in greater detail in FIG. 12. Upon entry into the service access administration routine, the present message services which are defined are displayed by block 1201. Then, control is transferred to decision block 1202 where the user is given the opportunity to decide whether or not to make changes, if the user decides not to make changes, control is passed back to the administration process via path 1209 and exit block 1112. If the user decides to make changes, then path 1208 is folowed to block 1203. In this block, the user is asked to specify the name of the service they wish to modify and control is passed to block 1204. In this block, the user specifies the type of service to be obtained from the named service. In block 1205, the user specifies the access number or numbers which will be used to access this particular service. For example, in the case of the e-mail service provided by computer 106, at block 1205, the user would specify the dialing information used by PC 110 to gain access to computer 106 via switching network 102. Next, block 1206 is executed where the user specifies the specific login sequence information which would include the responses from the message service system. Finally, the user specifies the polling routine that is to be used in block 1207 to poll the named service. This information is used to update the pointer words 502 through 507 of polling table as illustrated in FIG. 5. After execution of block 1207, control is once again transferred back to block 1201.

Figure 13:
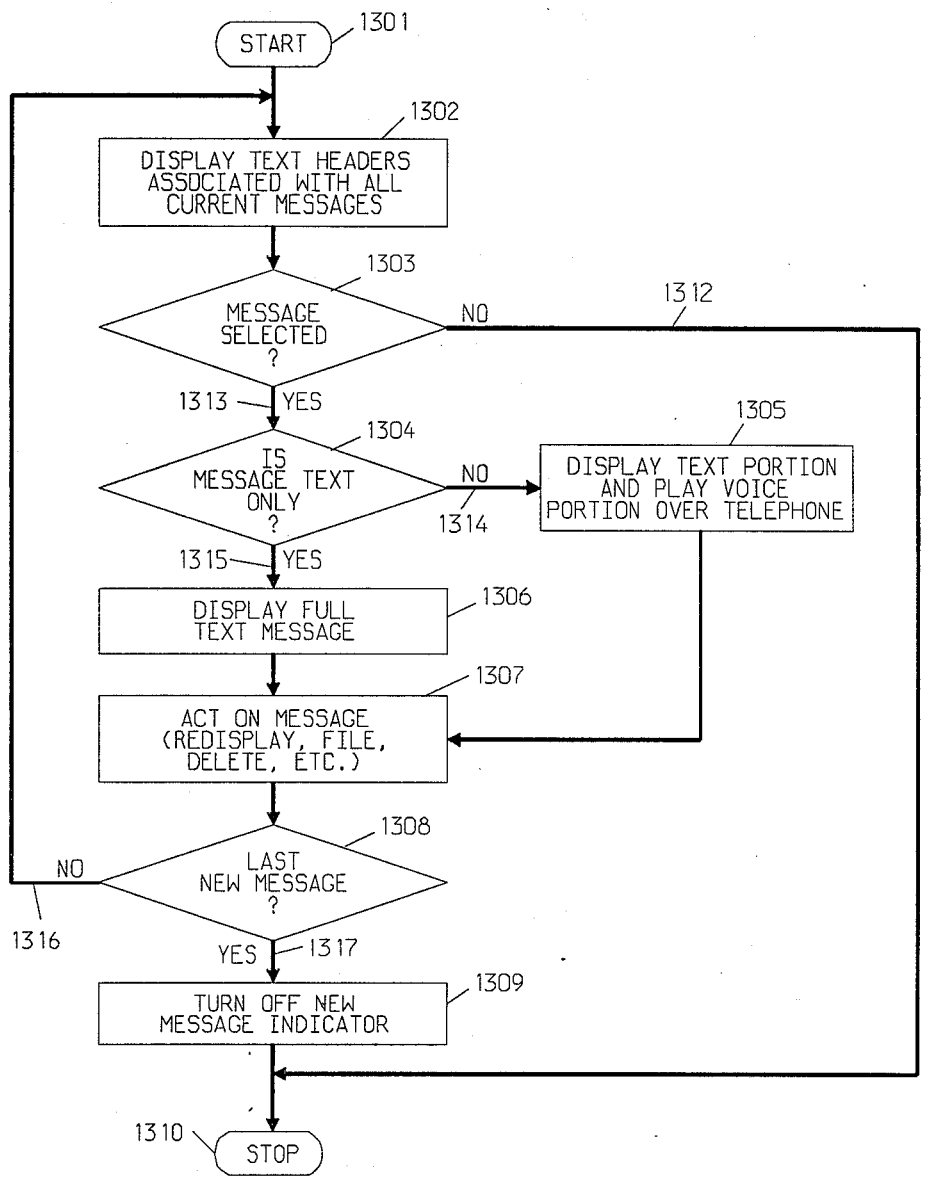
FIG. 13 illustrates, in flow diagram form, message recovery process 220 of FIG. 2.

Message recovery process 220 of FIG. 2 is illustrated in greater detail in FIG. 13. This process is used by the user of PC 110 to obtain the messages which PC 110 has collected from the message service systems. The process is entered by customer requesting it from the keyboard of PC 110, or it could be running as background process with the information constantly being displayed in a portion of the CRT display of PC 110. If this process is invoked by the customer requesting it, then the process is entered at block 1301. In block 1302, the text headers associated with all of the current messages are displayed on the CRT display in chronological order. Decision block 1303 gives the customer the opportunity to select which message they would like to interrogate. If the user decides to interrogate no messages, then path 1312 transfers them to the exit point 1310. If the user selects a message, then control is transferred to decision block 1304 via 1313. In decision block 1304, a decision is made whether the message is text only. If the message is both text and voice, then control is passed to block 1305 via path 1314. In block 1305, processor 209 accesses the digitized voice information from disk 206 and uses voice synthesizer 302 of card 202 to play the audio information through telephone 109 via the DCP interface card 201 to the user; and, at the same time, the text portion of the message including header information is displayed on the CRT display. After the information has been played and displayed, the customer is given an opportunity to redisplay, file, delete, or reply in block 1307. Decision block 1308 then determines whether the last new message had been interrogated. If all the messages have been interrogated, control is passed to block 1309 via path 1317. Block 1309 turns off the new message indicator stored in memory 208 and visual indicator on telephone 109.

If the message was text only, then the exit path from decision block 1304 is via path 1315 to block 1306 where the message is displayed in text form; and then, control is passed to block 1307. If the last new message had not been interrogated by decision block 1308, control is passed back to block 1302 via path 1316.

It is to be understood that the above-described embodiment is merely illustrative of the principles of the invention and that other arrangements may be devised by those skilled in the art without departing from the spirit and scope of the invention.

We claim:

1. Apparatus for use by subscriber of a communication switching system for obtaining stored messages from a plurality of message service systems via said communication switching system, each of said plurality of message service systems being capable of storing messages each with header information defining each message, comprising:
   means responsive to a signal from said communication switching system indicating that at least one of said plurality of message service systems has a message for said subscriber for polling each of said plurality of message service systems to identify the one of said plurality of message service systems having said message;
   means for obtaining from said identified one of said plurality of message service systems a header defining said message;
   means for reading said message from said identified one of said plurality of message service systems; and
   means for storing said read message and said obtained header information.

2. The apparatus of claim 1 further comprising means for automatically polling a subset of said plurality of message service systems at predefined intervals of time.

3. The apparatus of claim 1 wherein said polling means comprises means for retrieving sets of parameters for said plurality of message service systems, with each set of parameters being individual to one of said plurality of message service system; and
   means for accessing each of said plurality of said message service systems using each individual set of said parameters.

4. The apparatus of claim 3 wherein said obtaining means comprises means for reading in textual data form said header information by using the set of parameters for said identified one of said plurality of message service systems; and
   said storing means comprises means for storing said read textual header in a predefined order with respect to other previously read headers in textual data form.

5. The apparatus of claim 4 wherein said one of said plurality of said message service systems is a voice message service system having only voice signal headers and messages and said means for reading in textual form said header information comprises means responsive to one of said voice signal headers for transforming said one of said voice signal headers into textual data.

6. The apparatus of claim 5 wherein said predefined order is a first-in first-out ordering.

7. Apparatus for use by a user of a communication switching system for obtaining stored messages from a message storage system, said message storage system providing said user with the capability of accessing said messages by transmitting signals to said message storage system in response to verbal instructions from said message storage system, comprising:
   means for generating signals defining the logon procedure for said message storage system;
   means for recognizing verbal instructions from said message storage system;
   means responsive to the recognized verbal instructions for obtaining said messages by instructing said generating means to generate additional signals to said message storage system; and
   means for storing the obtained messages.

8. The apparatus of claim 7 further comprising means for extracting header information from said messages; and
   said storing means responsive to said extracting means for storing said header information.

9. The apparatus of claim 8 further comprising means for deleting said messages from said message storage system by instructing said generating means to generate additional signals to said message storage system.

10. Apparatus for retrieving stored messages from a plurality of message service systems, and said apparatus is adaptable to be interconnected to said plurality of message service systems by a communication switching system and each of a subset of said plurality of message service systems is responsive to receipt of a message to indicate receipt of a message to said communication switching system and the latter system is responsive to the indication to transmit a message waiting signal to said apparatus, comprising:
   means for generating a signal at predefined intervals of time; and
   means responsive to said signal for automatically polling each of said message service systems to determine the presence of a message on each of said plurality of message service systems;

means responsive to said message waiting signal for determining which one of said subset of said plurality of message service systems has a message; and means responsive to the determination for obtaining said latter message.

11. The apparatus of claim 10 wherein one of said plurality of said message service systems is a voice message service system having only voice signal headers and messages and said obtaining means comprises means responsive to one of said voice headers for transforming said one of said voice signal headers into textual data.

12. A method for obtaining stored message for a subscriber of a communication switching system from a plurality of messages service systems via said communication switching system and each of said plurality of message service systems capable of storing messages each with header information defining each message, the method comprising:

identifying ones of said plurality of message service systems having said messages in response to a signal from said communication switching system indicating that at least one of said plurality of message service systems has a message for said subscriber by polling each of said plurality of message service systems;

automatically polling a subset of said plurality of message service systems at predefined intervals of time;

obtaining from said identified one of said plurality of message service systems a header defining one of said messages;

reading said one of said messages from said identified one of said plurality of message service systems; and storing said red one of said messages and said obtained header information.

13. The method of claim 12 wherein said identifying step comprises the steps of retrieving sets of parameters for said plurality of message service systems, with each set of parameters being individual to one of said plurality of message service systems; and accessing each of said plurality of said message service systems using each individual set of said parameters thereby determining which of said plurality of message service systems generated said signal.

14. The method of claim 13 wherein said obtaining step comprises the steps of reading in textual data form said header information by using said set of parameters for said identified one of said plurality of message service systems; and said storing step comprises the step of storing said read header in textual data form in a predefined order with respect to other previously read headers in textual data form.

15. The method of claim 14 wherein said one of said plurality of said message service systems is a voiced message service system having only voice signal headers and messages and said step of reading in textual form said header information comprises the steps of transforming said header into textual data in response to said header and said message being voice signal; and extracting said header from said textual data.

16. The method of claim 15 wherein said predefined order is a first-in first-out ordering.

* * * * *